(12) United States Patent
Dorchak

(10) Patent No.: US 6,752,259 B1
(45) Date of Patent: Jun. 22, 2004

(54) FIXED SHAFT CAT DRIVE

(75) Inventor: Ronald Dorchak, Dearborn Heights, MI (US)

(73) Assignee: Central Conveyor Company, Brighton, MI (US)

( * ) Notice: Subject to any disclaimer, the term of this patent is extended or adjusted under 35 U.S.C. 154(b) by 0 days.

(21) Appl. No.: 10/314,475

(22) Filed: Dec. 9, 2002

Related U.S. Application Data

(60) Provisional application No. 60/376,466, filed on Apr. 29, 2002.

(51) Int. Cl.[7] ............................................... B65G 23/06
(52) U.S. Cl. ........................... 198/832; 198/834; 474/8; 474/24; 474/25; 474/26; 474/27
(58) Field of Search ................................. 198/834, 832; 474/8, 24, 25, 26, 27

(56) References Cited

U.S. PATENT DOCUMENTS 5,236,395 A * 8/1993 Lucich et al. .................. 474/69
6,267,060 B1 * 7/2001 Owens, Jr. .................... 104/166

* cited by examiner

*Primary Examiner*—Richard Ridley
(74) *Attorney, Agent, or Firm*—Charles W. Chandler

(57) ABSTRACT

A gear reducer having a hollow shaft is telescopically mounted on the upper end of a vertical conveyor drive shaft. The gear reducer is removed for repair by raising the gear reducer housing to separate the hollow shaft from the drive shaft while the drive shaft remains on the drive frame.

6 Claims, 3 Drawing Sheets

FIXED SHAFT CAT DRIVE

CROSS-REFERENCE TO RELATED APPLICATION

This application relates to Provisional Patent Application Serial No. 60/376,466 filed Apr. 29, 2002, for "Fixed Shaft Cat Drive".

BACKGROUND AND SUMMARY OF THE INVENTION

Power and free conveyors typically employ a drive chain for moving a conveyor component. A motor is connected through a gear reducer to a vertical drive shaft having chain sprocket which moves the drive chain. The drive shaft is normally externally connected to the gear reducer in such a manner that when it is necessary to repair or replace the gear reducer, the drive shaft must be disconnected from the sprocket, the supporting bearings and then raised with the gear reducer from the supporting conveyor structure. This process is difficult when the drive shaft must be raised with the reducer in an area with a low overhead. When the reducer has been repaired or replaced, the drive shaft must then be reconnected and aligned with the sprockets, bearings and supporting structure.

The broad purpose of the present invention is to provide an improved gear reducer having a gear box with a hollow internal shaft that is telescopically mounted on the upper end of the drive shaft. This permits the user to raise the gear box from the drive shaft without removing the drive shaft from its operating position.

A gear box having an internal drive motor and a hollow shaft can also be used.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
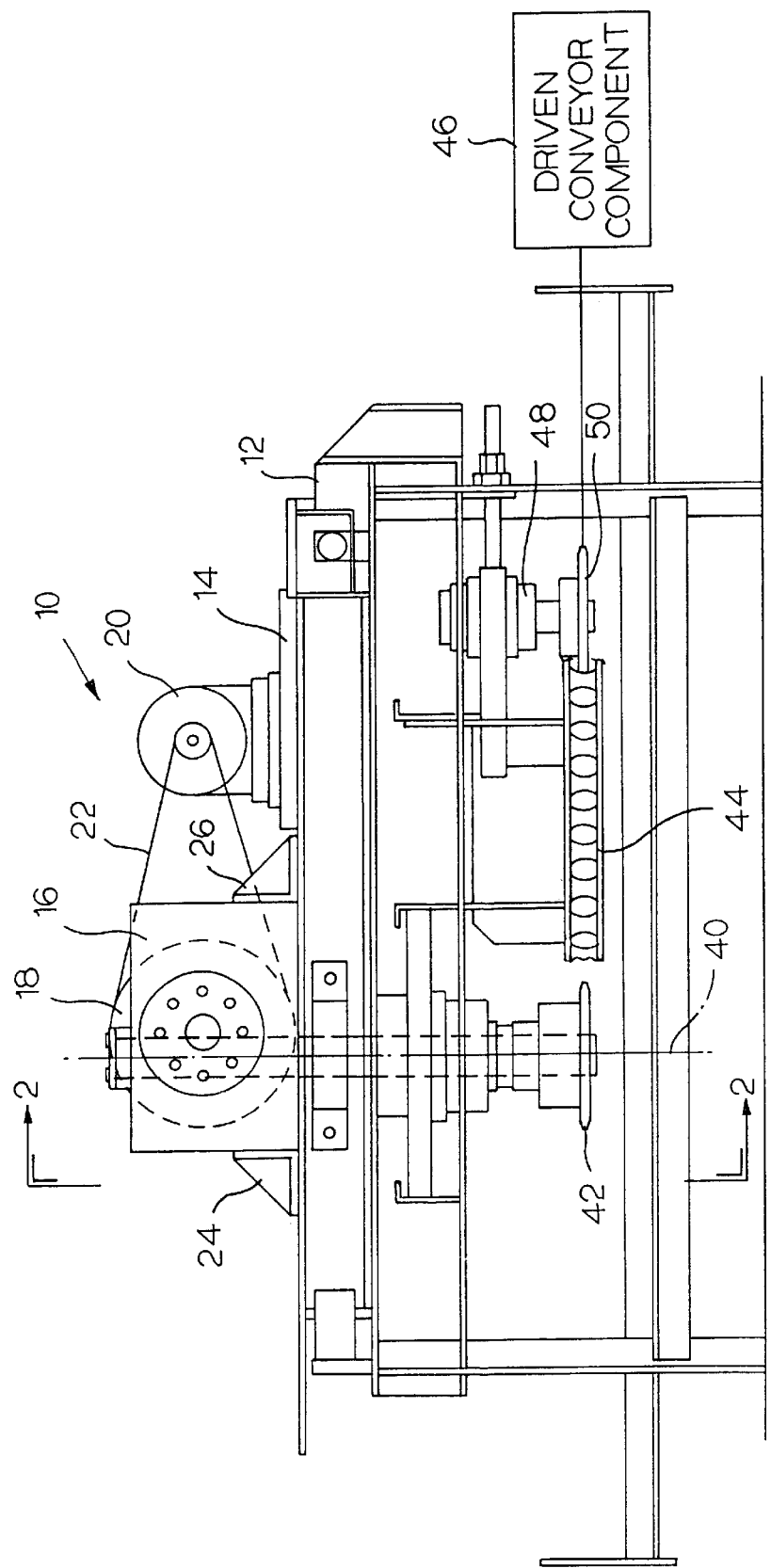
FIG. 1 is an elevational view of a caterpillar drive assembly illustrating the preferred embodiment of the invention, with the gear reducer telescopically mounted on the upper end of the drive shaft.
Figure 3:
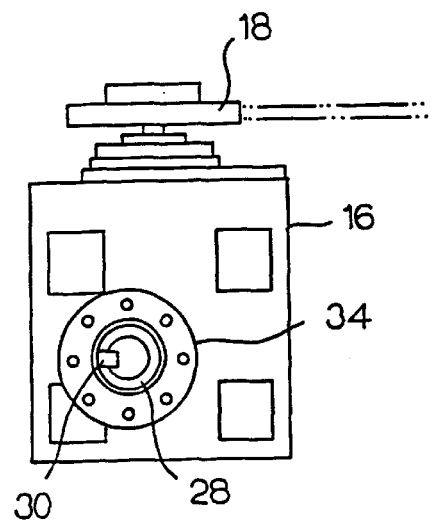
FIG. 3 is a plan view of the gear reducer.

Referring to the drawings, FIG. 1 illustrates a preferred conveyor drive assembly 10 mounted on a drive frame (base) 12 having a gear reducer mounting structure 14.

Drive assembly 10 includes a gear reducer 16 having a sheave 18 driven by an electric motor 20 mounted on drive frame 14. Motor 20 is connected to sheave 18 by a drive belt 22.

Gear reducer 16 is a Lenze Gear Reducer with shaft input 226.431 to 1 ratio #GKS-14-3W-SAR-1H, hollow shaft with compression coupling, hollow output shaft=3⅞" bore with viton shaft seals. The gear reducer is mounted between a pair of locating structures 24 and 26. Gear reducer 16 has a hollow shaft 28 with a keyway 30 for receiving a vertical drive shaft 32. A collar 34, fastened to the top wall of the gear reducer housing, is connected to the upper end of the vertical drive shaft.

Bearing means 38 support the drive shaft in a vertical position for rotation about an axis 40. Bearing means 38 is attached to support 12. The lower end of the drive shaft carries a sprocket 42 which is drivingly connected by a key 44 to the drive shaft. Sprocket 42 is meshed with a conveyor chain 44 which is connected to a driven conveyor component 46. Take-up means 48 mounted on support 12 employ a take-up sprocket 50 engaged with the chain to maintain it in a properly taut, horizontal condition.

In order to repair or replace the gear reducer, the following steps are taken:

1. Lockout the conveyor. Plant personnel should reference their plant specific safety and lockout procedures.
2. Remove the drive guard.
3. Remove the drive belts.
4. Disconnect the cat chain.
5. Remove the shear pin sprocket from the reducer output shaft.
6. Remove the reducer retaining bolts, relieving the clamping force of the shrink disk.
7. Remove the bolts holding the reducer to drive frame 12.
8. Utilizing a hoist and proper rigging procedures carefully to raise reducer 100 from the drive frame and the upper end of the drive shaft 32 in the direction of arrow 33.
9. Inspect reducer roller ring rollers for excessive wear or damage. Replace if necessary.
10. Utilizing a hoist and proper rigging procedures carefully install a new reducer into the drive frame by lowering the reducer on to the drive shaft such that the hollow shaft of the reducer telescopically receives the upper end of the drive shaft and the drive frame.
11. Reinstall the reducer retaining bolts, clamping the shrink disk to the drive shaft.
12. Reinstall the bolts to the drive frame.
13. Reinstall the shear pin sprocket onto the drive shaft.
14. Inspect the cat chain for excessive wear and replace if necessary.
15. Reinstall the cat chain and adjust the tension and conveyor chain engagement per the proper procedures.
16. Inspect the drive belts for excessive wear and replace if necessary.
17. Reinstall the drive belts and adjust for proper tension.
18. Reinstall the drive guard.
19. Fill the reducer with the appropriate lubricant.
20. Remove locks and restart conveyor per the appropriate startup procedures.

The gear reducer box has a height of about 15 inches and requires 18 inches head space to remove it from drive frame 12. A conventional gear reducer that is directly coupled to the drive shaft, which may be 3.5 feet long, requires about 48 inches of head space to clear an overhead structure.

Figure 5:
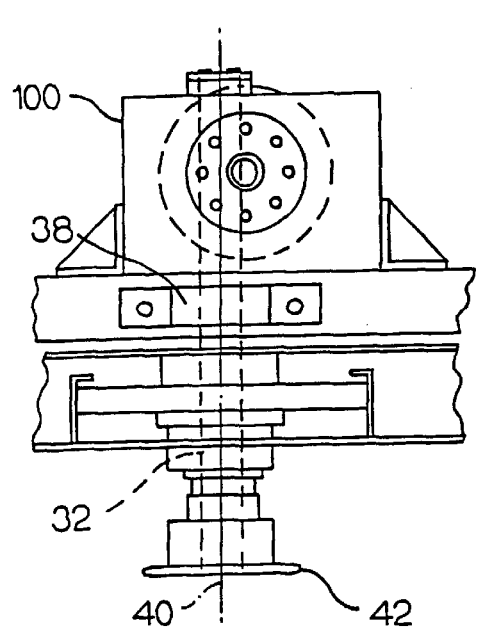
FIG. 5 illustrates the invention using a motor-driven gear reducer.
Figure 2:
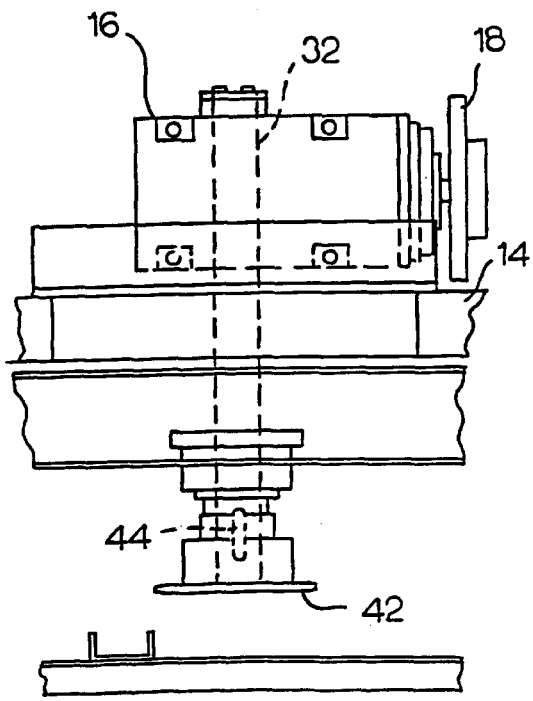
FIG. 2 is a view as seen along lines 2–2 of FIG. 1.
Figure 4:
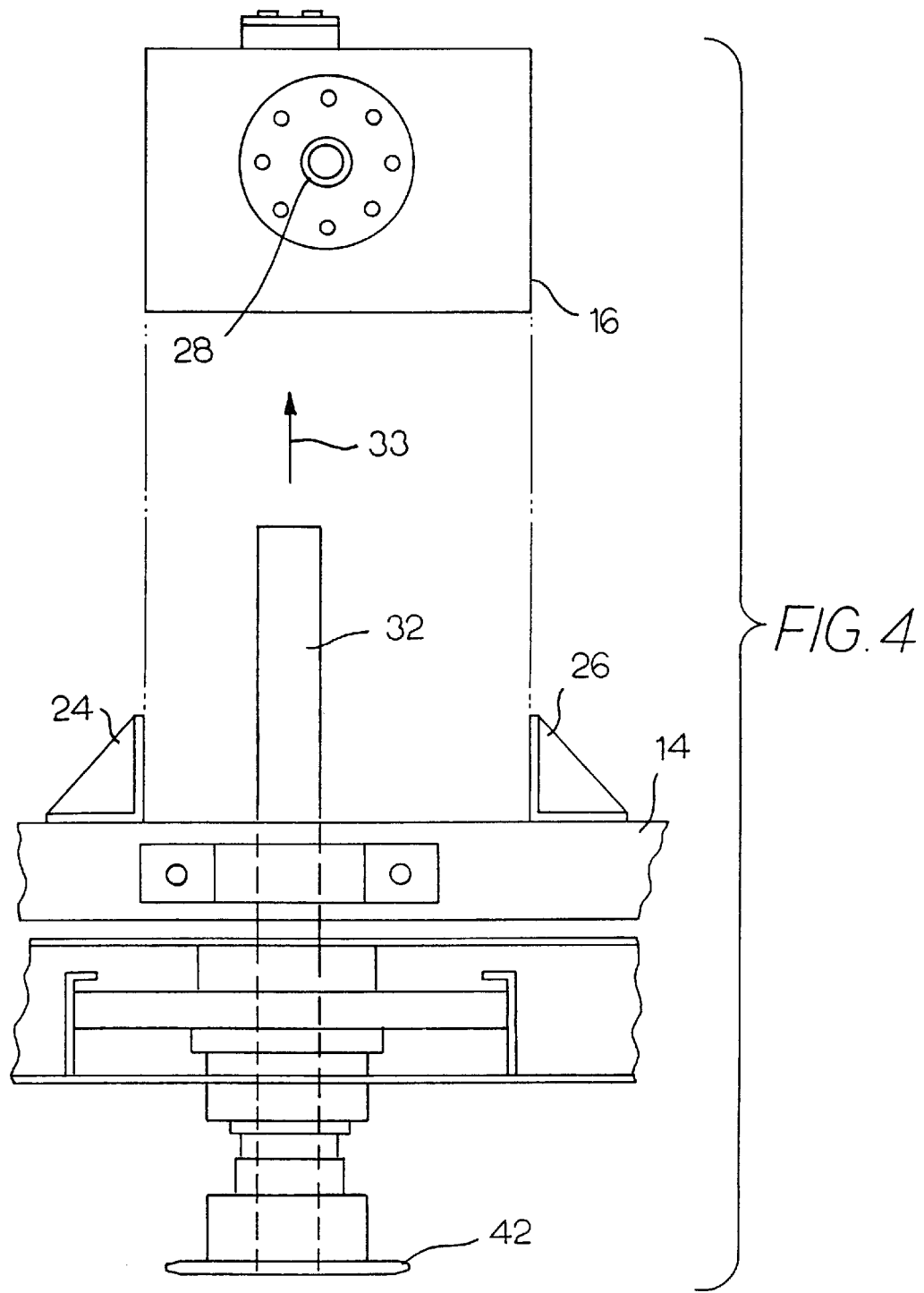
FIG. 4 is a view showing the gear reducer separated from the drive shaft.

FIG. 5 illustrates another embodiment of the invention in which a motor-driven gear reducer 100 is telescopically mounted on the upper end of drive shaft 32. Reducer 100 is separated from the drive shaft by raising the gear reducer until it clears the upper end of the drive shaft.

An arrangement employing a gear motor with a brake, as illustrated in FIG. 5, eliminates the belts, sheaves, bases, guards, mounts and fabrication tensioners that add cost and failure potentials. Further by obviating the necessity for removing the drive shaft from the drive frame, eliminates a requirement for realigning the sprockets and other items related to the drive shaft.

Having described my invention I claim:

1. Drive apparatus for a conveyor, comprising:

a drive frame;

a drive shaft having a rotating axis;

bearing means mounted on the drive frame for supporting the drive shaft for rotation about said rotating axis;

a drive sprocket mounted on the drive shaft;

a driven conveyor chain mounted on the drive sprocket so as to be moved as the drive shaft is being rotated about said rotating axis;

a driven conveyor component connected to the driven conveyor chain so as to be moved thereby; and a driving apparatus removably mounted on the drive frame, the driving apparatus including a hollow shaft telescopically mounted on the drive shaft so as to be removable from a driving position on the drive shaft by an axial motion along said rotating axis in a direction away from the drive frame while the drive shaft is connected to the drive frame.

2. A drive apparatus for a conveyor, in which the hollow shaft is keyed to the drive shaft.

3. A drive apparatus as defined in claim 1, in which the drive apparatus includes a sprocket driven gear reducer having said hollow shaft.

4. Drive apparatus as defined in claim 1, in which the drive apparatus includes a gear motor.

5. Drive apparatus as defined in claim 1, in which the drive shaft is supported in an upright position.

6. A method for removing a driving apparatus from a conveyor drive shaft supported in an upright position on a drive frame, drive shaft having an upper end and a rotating axis, bearing means mounted on the drive frame for supporting the drive shaft for rotation about said rotating axis, a drive sprocket mounted on the drive shaft, a driven conveyor chain mounted on the drive sprocket so as to be moved as the drive shaft is being rotated about said rotating axis, a driven conveyor component connected to the driven chain so as to be moved thereby, a driving apparatus removably mounted on the drive frame, the driving apparatus including a hollow shaft telescopically mounted on the upper end of the drive shaft, comprising the steps of:

raising the driving apparatus from a driving position on the drive shaft, by an axial motion along said rotating axis in a direction away from the drive frame while the drive shaft remains supported on the drive frame.

* * * * *